United States Patent
Ma et al.

(10) Patent No.: US 12,402,035 B2
(45) Date of Patent: Aug. 26, 2025

(54) COMMUNICATION METHOD AND APPARATUS

(71) Applicant: HUAWEI TECHNOLOGIES CO., LTD., Guangdong (CN)

(72) Inventors: Jingwang Ma, Shanghai (CN); Qufang Huang, Shenzhen (CN); Liping Yuan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 388 days.

(21) Appl. No.: 18/152,339

(22) Filed: Jan. 10, 2023

(65) Prior Publication Data
US 2023/0164631 A1    May 25, 2023

Related U.S. Application Data

(63) Continuation of application No. PCT/CN2021/101913, filed on Jun. 23, 2021.

(30) Foreign Application Priority Data

Jul. 22, 2020   (CN) ........................ 202010712537.6

(51) Int. Cl.
H04W 28/12    (2009.01)
H04M 15/00    (2024.01)
H04W 28/02    (2009.01)

(52) U.S. Cl.
CPC ........... *H04W 28/12* (2013.01); *H04M 15/66* (2013.01); *H04W 28/0268* (2013.01)

(58) Field of Classification Search
CPC .. H04M 15/66; H04W 28/0268; H04W 28/12
See application file for complete search history.

(56) References Cited

U.S. PATENT DOCUMENTS 10,588,052 B1 * 3/2020 Srivastava ............ H04W 76/10
2002/0126636 A1 * 9/2002 Chen ........................ H04L 45/50
                                                            370/466
(Continued)

FOREIGN PATENT DOCUMENTS

CN      111211852 A     5/2020
EP      3735030 A1      11/2020
(Continued)

OTHER PUBLICATIONS

QoS using Diffserv (Year: 2003).*
3GPP TS 23.501 V16.5.0 (Jul. 2020), 3rd Generation Partnership Project; Technical Specification Group Services and System Aspects; System architecture for the 5G System (5GS); Stage 2(Release 16), 441 pages.
Generic Slice Template. Oct. 2018, 92 pages.
(Continued)

*Primary Examiner* — Mehmood B. Khan

(57) ABSTRACT

This application provides a communication method and apparatus. In the method, a policy control function (PCF) receives request information from a terminal or a service server. The request information requests to establish a first quality of service (QoS) flow for the terminal, and includes first indication information indicating to perform network coding on the first QoS flow. The PCF sends network coding information to an access network device accessed by the terminal and/or the terminal based on the request information. The network coding information includes second indication information indicating a QoS flow on which network coding is to be performed.

20 Claims, 6 Drawing Sheets

(56) References Cited

U.S. PATENT DOCUMENTS

| | | | | |
|---|---|---|---|---|
| 2008/0107119 | A1* | 5/2008 | Chen | H04L 47/786 |
| | | | | 370/395.21 |
| 2009/0199268 | A1* | 8/2009 | Ahmavaara | H04L 63/20 |
| | | | | 726/1 |
| 2011/0058479 | A1* | 3/2011 | Chowdhury | H04L 45/04 |
| | | | | 370/237 |
| 2012/0314127 | A1* | 12/2012 | Syed | H04L 47/20 |
| | | | | 348/E7.045 |
| 2016/0373589 | A1* | 12/2016 | Chai | H04M 15/66 |
| 2018/0109503 | A1* | 4/2018 | Nádas | H04L 63/0428 |
| 2019/0075308 | A1 | 3/2019 | Wei et al. | |
| 2019/0098692 | A1* | 3/2019 | Atarius | H04L 65/1069 |
| 2020/0077469 | A1 | 3/2020 | Jain et al. | |
| 2020/0404538 | A1* | 12/2020 | Zhu | H04L 67/06 |
| 2023/0099649 | A1* | 3/2023 | Alonso | H04M 15/88 |
| | | | | 455/406 |

FOREIGN PATENT DOCUMENTS

| | | |
|---|---|---|
| JP | 2016131380 A | 7/2016 |
| WO | 2019141166 A1 | 7/2019 |
| WO | 2020146852 A1 | 7/2020 |

OTHER PUBLICATIONS

TCCA, LS on Generic Slice Template with Public Safety Feedback . 3GPP TSG SA Meeting #88E, Jun. 30-Jul. 3, 2020, Electronic meeting, SP-200311, 2 pages.

Huawei, HiSilicon, Challenges and potential enhancements for XR and Cloud Gaming. 3GPP TSG RAN WG1 Meeting #104bis-e, E-meeting, Apr. 12-Apr. 20, 2021, R1-2103390, 2 pages.

* cited by examiner

COMMUNICATION METHOD AND APPARATUS

CROSS-REFERENCE TO RELATED APPLICATIONS

This application is a continuation of International Application No. PCT/CN2021/101913, filed on Jun. 23, 2021, which claims priority to Chinese Patent Application No. 202010712537.6, filed on Jul. 22, 2020. The disclosures of the aforementioned applications are hereby incorporated by reference in their entireties.

TECHNICAL FIELD

This application relates to the field of communication technologies, and in particular, to a communication method and apparatus.

BACKGROUND

A basic idea of network coding is to allow an intermediate node (for example, an access network device or a user plane function (user plane function, UPF)) of a network to participate in encoding and decoding. In network coding, concepts of encoding and routing are integrated, and the intermediate node of the network implements both a routing function and an encoding function by allowing information from different links to be encoded and combined. Network coding can improve data transmission reliability, and avoid problems that a transmission delay cannot be ensured, a data transmission throughput decreases, and the like due to data retransmission caused by a packet loss in data transmission.

Currently, network coding may be performed between two point-to-point devices. How the two devices perform network coding, which type of network coding is used, and the like may be determined through negotiation between the two devices. Network coding has specific application value for some real-time media services with relatively high requirements for data transmission reliability and bandwidth, and can improve reliability and a throughput of data transmission. However, in a mobile communication network, how to apply network coding is a problem that urgently needs to be resolved.

SUMMARY

Embodiments of this application provide a communication method and apparatus, to improve reliability and a throughput of data transmission through network coding.

To achieve the foregoing objective, embodiments of this application provide the following technical solutions.

According to a first aspect, a communication method is provided. The method includes: A policy control function (PCF) receives request information from a terminal or a service server, and sends network coding information to an access network device accessed by the terminal and/or the terminal based on the request information. The service server is a service server of a service corresponding to a first quality of service (QoS) flow, the request information is used to request to establish the first QoS flow for the terminal, the request information includes first indication information used to indicate to perform network coding on the first QoS flow, and the network coding information includes second indication information used to indicate a QoS flow on which network coding is to be performed. In the method provided in the first aspect, a method for applying network coding to a mobile communication network is provided, and a core network may indicate to perform network coding on a QoS flow, so that a data transmission delay is reduced while transmission reliability of the QoS flow is improved.

In a possible implementation, the request information further includes one or both of the following information: information about a type of network coding performed on the first QoS flow, or information about a protocol layer used to implement the type of network coding performed on the first QoS flow. In this possible implementation, the request information may be used to select a related parameter of network coding used by the terminal.

In a possible implementation, the request information received by the PCF is from the service server, and the request information further includes one or more of the following information: address information of the terminal, address information of the service server, or an identifier of the terminal. In this possible implementation, the information included in the request information may be used for downlink service data transmission in a subsequent process.

In a possible implementation, the network coding information further includes one or both of the following information: information about a type of network coding performed on the QoS flow indicated by the second indication information, or information about a protocol layer used to implement the type of network coding performed on the QoS flow indicated by the second indication information. In this possible implementation, the terminal and the access network device can further determine a related parameter of network coding.

In a possible implementation, the method further includes: The PCF determines the network coding information. If the PCF determines to perform network coding on the first QoS flow, the QoS flow indicated by the second indication information is the first QoS flow; or if the PCF determines not to perform network coding on the first QoS flow, the QoS flow indicated by the second indication information is a second QoS flow. In this possible implementation, when determining not to perform network coding on the first QoS flow, the PCF determines to establish the second QoS flow, to ensure normal running of a service.

In a possible implementation, that the PCF determines the network coding information includes: The PCF determines the network coding information based on a network coding capability of the terminal and a network coding capability of the access network device. In this possible implementation, network coding information is determined by using the network coding capability of the terminal and the network coding capability of the access network device, to ensure that the terminal and the access network device can subsequently perform network coding based on the network coding information.

In a possible implementation, the network coding capability includes one or both of the following information: information about a type of supported network coding, or information about a protocol layer used to implement each type of the supported network coding.

In a possible implementation, the method further includes: The PCF receives the network coding capability from the terminal; and/or the PCF receives the network coding capability from the access network device. In this possible implementation, a method for obtaining the network coding capability of the terminal and the network coding capability of the access network device is provided.

According to a second aspect, a communication method is provided. The method includes: A communication device receives network coding information from a PCF. The network coding information includes second indication information used to indicate a QoS flow on which network coding is to be performed, and the communication device is a terminal or an access network device. The communication device performs network coding on the QoS flow indicated by the second indication information. In the method provided in the second aspect, a method for applying network coding to a mobile communication network is provided, and a core network may indicate to perform network coding on a QoS flow, so that a data transmission delay is reduced while transmission reliability of the QoS flow is improved.

In a possible implementation, the network coding information further includes one or both of the following information: information about a type of network coding performed on the QoS flow indicated by the second indication information, or information about a protocol layer used to implement the type of network coding performed on the QoS flow indicated by the second indication information. That the communication device performs network coding on the QoS flow indicated by the second indication information includes: The communication device performs, based on the network coding information, network coding on the QoS flow indicated by the second indication information. In this possible implementation, the terminal and the access network device can further determine a related parameter of network coding.

In a possible implementation, the method further includes: The communication device sends a network coding capability of the communication device to the PCF. The network coding capability includes one or both of the following information: information about a type of supported network coding, or information about a protocol layer used to implement each type of the supported network coding. In this possible implementation, a method for reporting the network coding capability of the communication device is provided.

In a possible implementation, the communication device is the terminal, and the method further includes: The communication device sends request information. The request information is used to request to establish a first QoS flow for the terminal, the request information includes first indication information, and the first indication information is used to indicate to perform network coding on the first QoS flow. The terminal sends the request information to the PCF, to request to establish a QoS flow on which network coding needs to be performed.

In a possible implementation, the request information further includes one or both of the following information: information about a type of network coding performed on the first QoS flow, or information about a protocol layer used to implement the type of network coding performed on the first QoS flow. In this possible implementation, the request information may be used to select a related parameter of network coding used by the terminal.

In a possible implementation, the QoS flow indicated by the second indication information is the first QoS flow or a second QoS flow.

According to a third aspect, a communication method is provided. The method includes: A service server generates request information. The request information is used to request to establish a first QoS flow for a terminal, the request information includes first indication information, the first indication information is used to indicate to perform network coding on the first QoS flow, and the service server is a service server of a service corresponding to the first QoS flow. The service server sends the request information to a PCF. In the method provided in the third aspect, the service server sends the request information to the PCF, to request to establish a QoS flow on which network coding needs to be performed.

In a possible implementation, the request information further includes one or both of the following information: information about a type of network coding performed on the first QoS flow, or information about a protocol layer used to implement the type of network coding performed on the first QoS flow. In this possible implementation, the request information may be used to select a related parameter of network coding used by the terminal.

In a possible implementation, the request information further includes one or more of the following information: address information of the terminal, address information of the service server, or an identifier of the terminal. In this possible implementation, the information included in the request information may be used for downlink service data transmission in a subsequent process.

According to a fourth aspect, a communication apparatus is provided. The apparatus includes a communication unit and a processing unit. The communication unit is configured to receive request information from a terminal or a service server. The request information is used to request to establish a first QoS flow for the terminal, the request information includes first indication information, the first indication information is used to indicate to perform network coding on the first QoS flow, and the service server is a service server of a service corresponding to the first QoS flow. The processing unit is configured to send network coding information to an access network device accessed by the terminal and/or the terminal based on the request information by using the communication unit. The network coding information includes second indication information, and the second indication information is used to indicate a QoS flow on which network coding is to be performed.

In a possible implementation, the request information further includes one or both of the following information: information about a type of network coding performed on the first QoS flow, or information about a protocol layer used to implement the type of network coding performed on the first QoS flow.

In a possible implementation, the request information received by the communication unit is from the service server, and the request information further includes one or more of the following information: address information of the terminal, address information of the service server, or an identifier of the terminal.

In a possible implementation, the network coding information further includes one or both of the following information: information about a type of network coding performed on the QoS flow indicated by the second indication information, or information about a protocol layer used to implement the type of network coding performed on the QoS flow indicated by the second indication information.

In a possible implementation, the processing unit is further configured to determine the network coding information. If the processing unit determines to perform network coding on the first QoS flow, the QoS flow indicated by the second indication information is the first QoS flow; or if the processing unit determines not to perform network coding on the first QoS flow, the QoS flow indicated by the second indication information is a second QoS flow.

In a possible implementation, the processing unit is configured to determine the network coding information based on a network coding capability of the terminal and a network coding capability of the access network device.

In a possible implementation, the network coding capability includes one or both of the following information: information about a type of supported network coding, or information about a protocol layer used to implement each type of the supported network coding.

In a possible implementation, the communication unit is further configured to receive the network coding capability from the terminal; and the communication unit is further configured to receive the network coding capability from the access network device.

According to a fifth aspect, a communication apparatus is provided. The apparatus includes a communication unit and a processing unit. The communication unit is configured to receive network coding information from a PCF. The network coding information includes second indication information, the second indication information is used to indicate a QoS flow on which network coding is to be performed, and the communication apparatus is a terminal or an access network device. The processing unit is configured to perform network coding on the QoS flow indicated by the second indication information.

In a possible implementation, the network coding information further includes one or both of the following information: information about a type of network coding performed on the QoS flow indicated by the second indication information, or information about a protocol layer used to implement the type of network coding performed on the QoS flow indicated by the second indication information; and the processing unit is specifically configured to perform, based on the network coding information, network coding on the QoS flow indicated by the second indication information.

In a possible implementation, the communication unit is further configured to send a network coding capability of the communication apparatus to the PCF. The network coding capability includes one or both of the following information: information about a type of supported network coding, or information about a protocol layer used to implement each type of the supported network coding.

In a possible implementation, the communication apparatus is the terminal, and the communication unit is further configured to send request information. The request information is used to request to establish a first QoS flow for the terminal, the request information includes first indication information, and the first indication information is used to indicate to perform network coding on the first QoS flow.

In a possible implementation, the request information further includes one or both of the following information: information about a type of network coding performed on the first QoS flow, or information about a protocol layer used to implement the type of network coding performed on the first QoS flow.

In a possible implementation, the QoS flow indicated by the second indication information is the first QoS flow or a second QoS flow.

According to a sixth aspect, a communication apparatus is provided. The apparatus includes a processing unit and a communication unit. The processing unit is configured to generate request information. The request information is used to request to establish a first QoS flow for a terminal, the request information includes first indication information, the first indication information is used to indicate to perform network coding on the first QoS flow, and the communication apparatus is a communication apparatus of a service corresponding to the first QoS flow. The communication unit is configured to send the request information to a PCF.

In a possible implementation, the request information further includes one or both of the following information: information about a type of network coding performed on the first QoS flow, or information about a protocol layer used to implement the type of network coding performed on the first QoS flow.

In a possible implementation, the request information further includes one or more of the following information: address information of the terminal, address information of the communication apparatus, or an identifier of the terminal.

According to a seventh aspect, a communication apparatus is provided. The apparatus includes a processor, and a processor is coupled to a memory. The memory is configured to store computer executable instructions, and the processor executes the computer executable instructions stored in the memory, so that the communication apparatus implements any method provided in any one of the first aspect to the third aspect. The apparatus may exist in a product form of a chip.

According to an eighth aspect, a communication apparatus is provided. The communication apparatus includes a processor and an interface, and the processor is coupled to a memory through the interface. When the processor executes a computer program or instructions in the memory, any method provided in any one of the first aspect to the third aspect is performed.

According to a ninth aspect, a communication system is provided. The system includes one or more of the communication apparatuses provided in the fourth aspect to the sixth aspect.

According to a tenth aspect, a computer-readable storage medium is provided. The computer-readable storage medium includes instructions, and when the computer-readable storage medium runs on a computer, the computer performs any method provided in any one of the first aspect to the third aspect.

According to an eleventh aspect, a computer program product including instructions is provided. When the computer program product runs on a computer, the computer performs any method provided in any one of the first aspect to the third aspect.

For beneficial effects of the communication apparatus, the communication system, the computer-readable storage medium, and the computer program product that correspond to the method in the foregoing aspects, refer to beneficial effects of the corresponding method. Details are not described again. It should be noted that, all possible implementations of any one of the foregoing aspects can be combined when the solutions do not conflict with each other.

DESCRIPTION OF EMBODIMENTS

In the descriptions of embodiments of this application, "/" means "or" unless otherwise specified. For example, AB may represent A or B. In this specification, "and/or" describes only an association relationship for describing associated objects and represents that three relationships may exist. For example, A and/or B may represent the following three cases: Only A exists, both A and B exist, and only B exists. In the descriptions of this application, unless otherwise stated, "at least one" refers to one or more, and "a plurality of" refers to two or more.

In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference.

The technical solutions in embodiments of this application may be applied to a 4th generation (4th Generation, 4G) system, various systems evolved based on the 4G system, a 5th generation (5th Generation, 5G) system, and various systems evolved based on the 5G system. The 4G system may also be referred to as an evolved packet system (evolved packet system, EPS). A core network of the 4G system may be referred to as an evolved packet core (evolved packet core, EPC), and an access network of the 4G system may be referred to as long term evolution (long term evolution, LTE). A core network of the 5G system may be referred to as a 5GC (5G core), and an access network of the 5G system may be referred to as new radio (new radio, NR). For ease of description, the following uses an example in which this application is applied to the 5G system to describe this application. When this application is applied to the 4G system or another communication system, a network element involved in this application is replaced with a network element with a same or similar function in the corresponding communication system.

Figure 1:
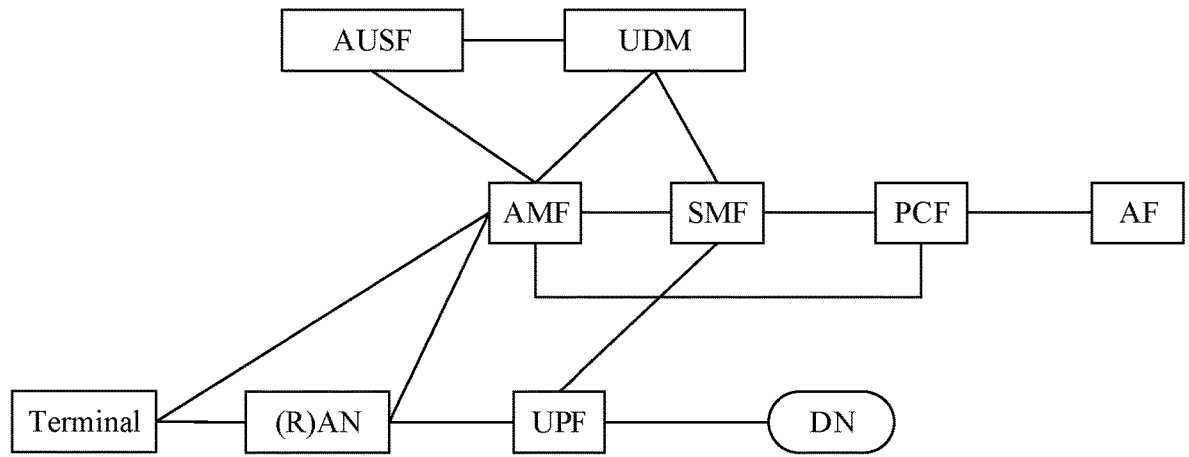
FIG. 1 is a schematic diagram of a network architecture of a 5G system.

FIG. 1 is a schematic diagram of an example of a network architecture of a 5G system. In the schematic diagram, the 5G system may include an authentication server function (authentication server function, AUSF) network element, an access and mobility management function (access and mobility management function, AMF) network element, a data network (data network, DN), a unified data management (unified data management, UDM) network element, a policy control function (policy control function, PCF) network element, a (radio) access network ((radio) access network, (R)AN) network element, a UPF network element, a terminal (terminal), an application function (application function, AF) network element, and a session management function (session management function, SMF) network element.

For ease of description, the (R)AN network element, the AMF network element, the SMF network element, the UDM network element, the UPF network element, the PCF network element, and the like are respectively represented by a RAN, an AMF, an SMF, a UDM, a UPF, a PCF, and the like below.

The 5G system is divided into an access network and a core network. The access network is configured to implement functions related to radio access, and mainly includes the RAN. The core network is used for network service control, data transmission, and the like. The core network includes a plurality of network elements, and mainly includes the AMF, the SMF, the UPF, the PCF, the UDM, and the like.

Functions of some network elements in FIG. 1 are as follows:

The PCF is responsible for providing policies such as a quality of service (quality of service, QoS) policy and a slice selection policy to the AMF and the SMF.

The UDM is configured to store user data such as subscription information and authentication/authorization information.

The AF may be an application server, and may belong to an operator or a third party. The AF mainly supports interaction with a 3rd generation partnership project (3rd generation partnership project, 3GPP) core network to provide services, for example, affecting a data routing decision, a policy control function, or some third-party services provided to a network side.

The AMF is mainly responsible for a signaling processing part, for example, functions such as terminal registration management, terminal connection management, terminal reachability management, terminal access authorization and access authentication, a terminal security function, terminal mobility management (for example, terminal location update, registration of the terminal with a network, or terminal handover), network slice (network slice) selection, SMF selection, and terminal registration or de-registration.

The SMF is mainly responsible for all control plane functions of terminal session management, including UPF selection, control, and redirection, internet protocol (internet protocol, IP) address assignment and management, session QoS management, obtaining of a policy and charging control (policy and charging control, PCC) policy from the PCF, bearer or session establishment, modification, and releasing, and the like.

The UPF serves as an anchor point for a protocol data unit (protocol data unit, PDU) session connection, and is responsible for terminal packet filtering, data transmission/forwarding, rate control, charging information generation, user plane QoS processing, uplink transmission authentication, transmission level verification, downlink packet caching, downlink data notification triggering, and the like. The UPF may also serve as a branch point of a multi-host (multi-homed) PDU session. A transmission resource and a scheduling function in the UPF that serve the terminal are managed and controlled by the SMF.

The RAN is a network including one or more access network devices (which may also be referred to as RAN nodes or network devices), and implements functions such as a radio physical layer function, resource scheduling and radio resource management, radio access control and mobility management functions, quality of service management, and data compression and encryption. The access network device is connected to the UPF through a user plane interface N3, and is configured to transmit data of the terminal. The access network device establishes a control plane signaling connection to the AMF through a control plane interface N2, and is configured to implement functions such as radio access bearer control.

The access network device may be a base station, a wireless fidelity (wireless fidelity, Wi-Fi) access point (access point, AP), a worldwide interoperability for microwave access (worldwide interoperability for microwave access, WiMAX) station, or the like. There may be various forms of base stations, for example, a macro base station, a micro base station (also referred to as a small cell), a relay station, and an access point. The base station may be specifically an AP in a wireless local area network (wireless local area network, WLAN), a base transceiver station (base transceiver station, BTS) in a global system for mobile communications (global system for mobile communications, GSM) or code division multiple access (code division multiple access, CDMA), or may be a NodeB (NodeB, NB) in wideband code division multiple access (wideband code division multiple access, WCDMA), or may be an evolved NodeB (evolved nodeB, eNB or eNodeB) in LTE, a relay station, an access point, a vehicle-mounted device, a wearable device, a next-generation NodeB (the next generation nodeB, gNB) in a future 5G system, a base station in a future evolved public land mobile network (public land mobile network, PLMN), or the like.

The terminal may be a wireless terminal or a wired terminal. A wireless terminal may refer to a device that provides a user with voice and/or data connectivity, a handheld device with a wireless connection function, or another processing device connected to a wireless modem. The terminal and the access network device communicate with each other by using an air interface technology (for example, an NR technology or an LTE technology). Terminals may also communicate with each other by using an air interface technology (for example, the NR technology or the LTE technology). The wireless terminal may communicate with one or more core network devices such as the AMF and the SMF by using the access network device. The wireless terminal may be a mobile terminal such as a mobile phone (also referred to as a "cellular" phone), a smartphone, a satellite radio device, a wireless modem card, or a computer with a mobile terminal, for example, may be a laptop, portable, pocket-sized, handheld, computer built-in, or in-vehicle mobile apparatus that exchanges voice and/or data with the access network device. For example, the wireless terminal may be a device such as a personal communications service (personal communication service, PCS) phone, a cordless phone, a session initiation protocol (session initiation protocol, SIP) phone, a wireless local loop (wireless local loop, WLL) station, a personal digital assistant (personal digital assistant, PDA), virtual reality (virtual reality, VR) glasses, augmented reality (augmented reality, AR) glasses, a machine type communication terminal, or an internet of things terminal. In internet of vehicles communication, a communication device mounted on a vehicle is a terminal, and a road side unit (road side unit, RSU) may also be used as a terminal. A communication device mounted on a drone may also be considered as a terminal. The wireless terminal may also be referred to as user equipment (user equipment, UE), a terminal device, a subscriber unit (subscriber unit), a subscriber station (subscriber station), a mobile station (mobile station), a mobile console (mobile), a remote station (remote station), an access point (access point), an access terminal (access terminal), a user terminal (user terminal), a user agent (user agent), and the like.

The DN is an operator network that provides a data transmission service to a user, for example, an internet protocol multimedia service (IP multi-media service, IMS) and the internet (Internet). The terminal accesses the DN by establishing a PDU session (PDU session) from the terminal to the access network device to the UPF to the DN.

It may be understood that, in addition to the functional network elements shown in FIG. 1, the network architecture of the 5G network may include another functional network element. For example, a network exposure function (network exposure function, NEF) network element may be further included between the AF and the PCF, and may be configured to exchange internal and external information of the network and the like. In this embodiment of this application, a network element may also be referred to as an entity, a device, or the like.

It should be noted that the RAN, the AMF, the SMF, the AUSF, the UDM, the UPF, the PCF, and the like in FIG. 1 are merely names, and the names constitute no limitation on the network elements. In the 5G system and another future network, entities or devices corresponding to these network elements may be alternatively other names. This is not specifically limited in this embodiment of this application. For example, the UDM may be further replaced with a home subscriber server (home subscriber server, HSS), a user subscription database (user subscription database, USD), a database network element, or the like. Descriptions are made together herein, and are not repeated below.

To make embodiments of this application clearer, the following briefly describes some concepts involved in this application.

1. PDU Session and QoS Flow (Flow)

Figure 2:
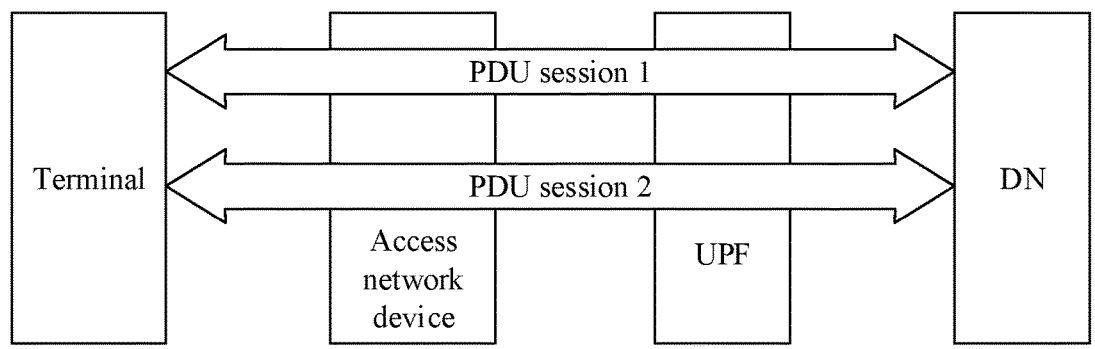
FIG. 2 is a schematic diagram of a PDU session.

Referring to FIG. 2, a PDU session is a connection between a terminal and a DN, and is used to provide a PDU connection service. A PDU session type may be an IP connection, an ethernet connection, an unstructured data connection, or the like. A PDU connection service supported by a core network of a 5G system is a service that provides PDU exchange between the terminal and a DN determined by a data network name (data network name, DNN). The terminal may initiate one or more PDU sessions to connect to a same DN or different DNs. For example, in FIG. 2, the terminal initiates establishment of a PDU session 1 and a PDU session 2 to connect to a same DN.

Figure 3:
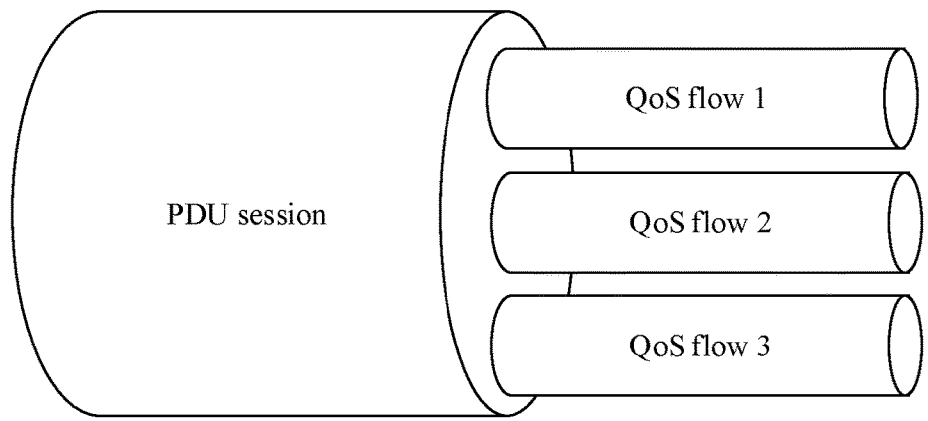
FIG. 3 is a schematic diagram of a PDU session and a QoS flow.

One PDU session may include one or more QoS flows, one QoS flow identifier (QoS flow identity, QFI) is used to identify one QoS flow, and one QoS flow is associated with one QoS profile (profile). Each QoS flow may carry one or more services. For example, as shown in FIG. 3, one PDU session includes three QoS flows: a QoS flow 1, a QoS flow 2, and a QoS flow 3. In one QoS flow, QoS of different services is the same.

In a current QoS model, for a downlink packet, when a UPF receives downlink packets, the UPF encapsulates, according to a packet detection rule filter (packet detection rule filter, PDR filter) preconfigured by an SMF, downlink packets with a same reliability requirement into a same QoS flow. A plurality of QoS flows may exist in one PDU session. A network side uses, based on a parameter in a QoS profile, a same QoS guarantee such as a same delay, a forwarding priority, or a packet loss rate for packets that belong to a same QoS flow. When an access network device receives downlink QoS flows from the UPF, the access network device encapsulates a plurality of QoS flows into a same radio bearer (radio bearer, RB) according to a specific mapping rule, and the same RB ensures same air interface side reliability.

A transmission process of an uplink packet is an inverse process of a transmission process of a downlink packet, and may be understood with reference to the transmission process of the downlink packet. Details are not described.

2. Network Coding

A basic principle of network coding is as follows: If a transmit end needs to send n (where n is an integer greater than 0) packets, the transmit end may multiply the n packets by a preset matrix to change the n packets into n' (where n' is an integer greater than n) packets, and send the n' packets to a receive end. Provided that the receive end receives any n packets in the n' packets, the receive end can restore, by using the preset matrix, the n packets to be sent by the transmit end, without receiving all the n' packets, so that data transmission reliability is improved while a data transmission delay requirement is met.

Types of network coding include random linear network coding (random linear network coding, RLNC), batched sparse (BATched Sparse, BATS) coding, fountain coding, and the like.

Advantages of using network coding to perform data transmission include improving a network throughput, improving network load balancing, improving bandwidth utilization, improving reliability, and reducing energy consumption of a wireless network node.

The foregoing briefly describes the concepts involved in this application.

The method provided in embodiments of this application may be applied to an extended reality (extended reality, XR) service that includes AR, VR, and mixed reality (mixed reality, MR). In other words, XR is actually a general term, and includes at least one of an AR service, a VR service, and an MR service. The AR technology is a technology that ingeniously integrates virtual information with a real world. A variety of technical means such as multimedia, three-dimensional modeling, real-time tracking and registration, intelligent interaction, and sensing are widely used to simulate virtual information such as words, images, three-dimensional models, music, and videos generated by a computer and then apply simulated information to the real world. The two types of information complement each other to implement "enhancement" to the real world. The VR technology is also referred to as a spiritual technology. The VR technology incorporates computer, electronic information, and simulation technologies. A basic implementation of the VR technology is that a computer simulates a virtual environment to give a person an immersive feel of an environment. A virtual scene created by the MR technology can enter a real life and recognize a user. For example, when a user sees a scene with eyes through a device of the user, the user can measure a scale and an orientation of an object in real life. A largest feature of the MR technology is that a virtual world can interact with the real world. XR is an environment that is generated by using the computer technology and a wearable device, that is a combination of real and virtual worlds, and that supports human-computer interaction. XR is put forward on the basis of AR, VR, and MR. The XR service is intended to achieve an effect of interactive immersive experience by using a high-speed network, a 360-degree image technology, and another technology. The XR service is a new service supported by a 5G system, is applied to applications such as entertainment, education, and health applications for ordinary consumers, and may also be applied to vertical industry scenarios such as industrial manufacturing and engineering. For some data transmission characteristics of the XR service, refer to Table 1.

TABLE 1

| Service type | Cloud VR (Cloud VR) | Cloud gaming | AR |
|---|---|---|---|
| Service rate | UL: 640 Kbps DL: 100-250 Mbps | UL: 640 Kbps DL: 100 Mbps | UL 1: 640 Kbps UL 2: 20 Mbps DL: 100-250 Mbps |
| Service delay | <10 ms | <15 ms | <10 ms |
| Service type | Cloud VR (Cloud VR) | Cloud gaming | AR |

Remarks:
UL means "uplink (Uplink)",
DL means "downlink (downlink)",
Kbps means "kilo bit per second",
Mbps means "megabit per second", and
ms means "millisecond"

In addition to the foregoing XR service, the 5G system supports a tactile internet (tactile internet) service. The tactile internet incorporates one or more of AR, VR, and MR, the 5G system, haptic sense (Haptic sense), and another latest technology, and is further evolution of the internet technology. Therefore, the internet further evolves from a content transmission network to a skill transmission network. In addition, the tactile internet provides a new human-computer interaction manner, and provides real-time tactile experience in addition to vision and hearing experience, so that a user can more naturally interact with a virtual environment. In addition, the tactile internet defines basic communication networks with a low delay, high reliability, high connection density, and high security. The tactile internet is one of important application scenarios of the 5G system, and may be widely applied to industry applications that require ms-level responses, for example, industrial control, automatic driving, a smart grid, games, entertainment, health, and education, and extends network functions from environment information monitoring to environment control. For a data transmission characteristic of the tactile internet service, refer to Table 2.

TABLE 2

| Service data type | Rate corresponding to the service data type | Delay corresponding to the service data type | Delay requirement of synchronization between data of different service types |
|---|---|---|---|
| Visual data | 4K: 15-25 Mbps 16K: 100-500 Mbps | 10-20 ms | Delay requirement of data and tactile data at a same moment: less than 10 ms synchronization between video |
| Tactile data | 1000-4000 packets/second | 2 ms | |
| Service data type | Rate corresponding to the service data type (Packets/second) | Delay corresponding to the service data type | Delay requirement of synchronization between data of different service types |
| Sound data | 10-30 Kbps | 100 ms | |
| Instruction data | Kbps level | 2 ms | |

Remarks: "4K" and "16K" are resolution

On the tactile internet, a same application may include a plurality of data flows such as a tactile data flow, a visual data flow, and a sound data flow. The data flows have different reliability and rate requirements. Therefore, a core network maps different data flows to different QoS flows.

Real-time media services such as the XR service and the tactile internet service are sensitive to a delay. For example, when a frame rate is 90, a downlink transmission time window of cloud VR for each frame is 11 ms (in other words, a delay requirement is 11 ms), when a sampling frame rate of tactile data on the tactile internet is 500 times per second, a delay requirement of tactile data for each frame is 2 ms, and retransmission is hardly allowed. Therefore, an existing mechanism of using retransmission to ensure reliability cannot meet a service requirement. Therefore, this application provides a communication method. Network coding is performed on a QoS flow or some QoS flows, to reduce a data transmission delay while improving data transmission reliability, so that the communication method meets service requirements of the XR service and the tactile internet.

Figure 4:
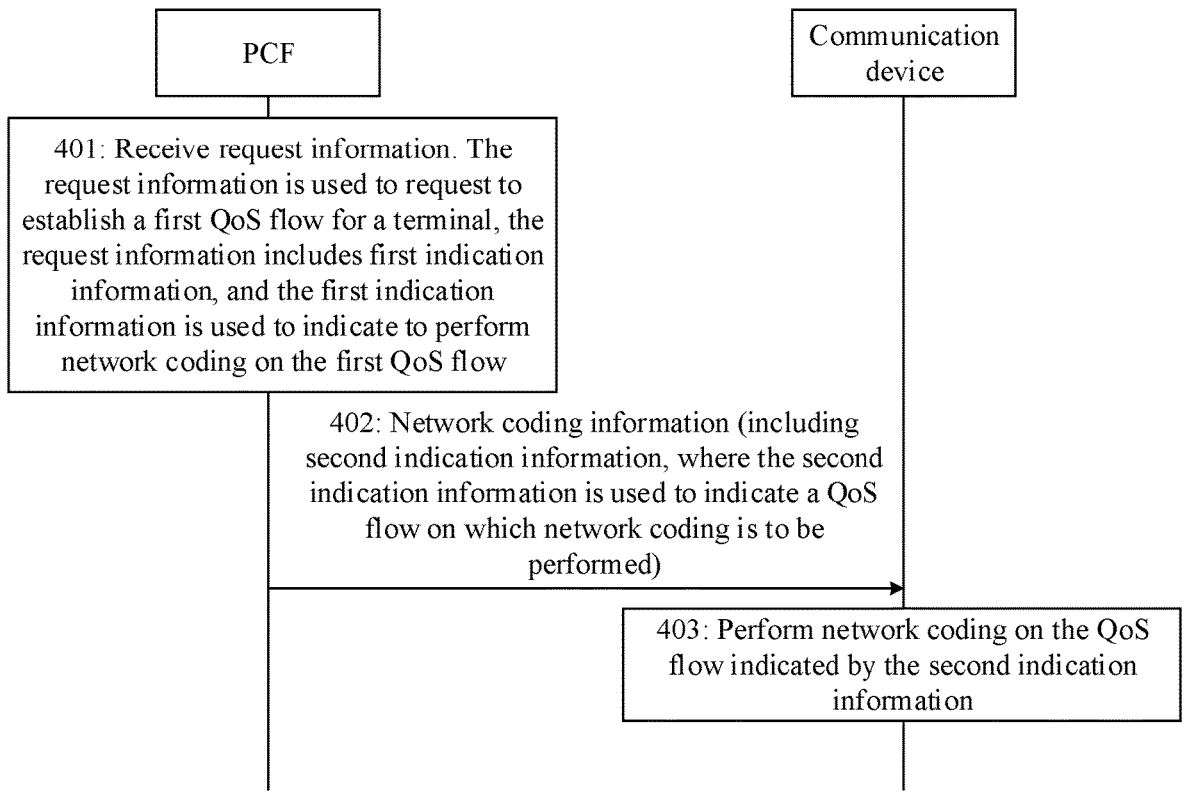
FIG. 4 is a flowchart of a communication method according to an embodiment of this application.

Referring to FIG. 4, the method includes the following steps.

401: A PCF receives request information. The request information is used to request to establish a first QoS flow for a terminal, the request information includes first indication information, and the first indication information is used to indicate to perform network coding on the first QoS flow.

Step 401 may be implemented in the following Manner 1 or Manner 2.

Manner 1: An SMF sends the request information to the PCF. Correspondingly, the PCF receives the request information from the SMF.

In Manner 1, the terminal may send the request information to an AMF by using an access network device. After receiving the request information, the AMF sends the request information to the SMF. After receiving the request information, the SMF further sends the request information to the PCF. When enabling a service, the terminal may send the request information to the AMF, to establish a QoS flow (namely, the first QoS flow) corresponding to the service.

In Manner 1, for example, the terminal may trigger a PDU session modification (PDU session modification) procedure, and send the request information to the AMF in the PDU session modification procedure.

Manner 2: A service server generates the request information, and sends the request information to the PCF. Correspondingly, the PCF receives the request information from the service server.

The service server is a service server of a service corresponding to the first QoS flow. In Manner 2, the service server may send the request information to the PCF by using an NEF. The service server may send the request information to the PCF when the service server needs to send downlink service data to the terminal or has established a service data flow connection to the terminal.

In Manner 2, for example, the service server may trigger a PDU session modification procedure, and send the request information to the PCF in the PDU session modification procedure.

In this embodiment of this application, the service (denoted as a first service) corresponding to the first QoS flow may be a high-reliability and/or low-delay service. The high-reliability service may be a service in which a packet loss rate is less than or equal to a first threshold or a quantity of lost packets in a time period of a specific length is less than or equal to a second threshold. The low-delay service may be a service whose delay is less than or equal to a third threshold. The first threshold, the second threshold, and the third threshold may be preset or specified in a protocol. This is not limited in this application. For example, the first threshold may be 0.1%, the second threshold may be 2, and the third threshold may be 10 ms. For example, the first service may be an XR service, a tactile internet service, or another service that requires high reliability and a low delay.

Figure 5:
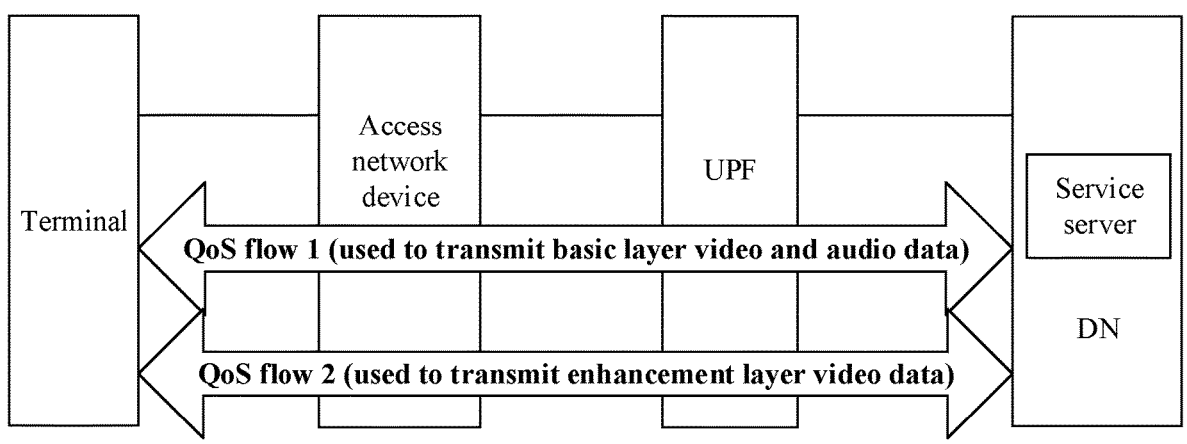
FIG. 5 is a schematic diagram of a QoS flow according to an embodiment of this application.

It can be learned from the foregoing descriptions that on the tactile internet, a same application may include a plurality of data flows such as a tactile data flow, a visual data flow, and a sound data flow. The data flows have different reliability and rate requirements. Therefore, a core network maps different data flows to different QoS flows. For example, for the visual data flow, basic layer video and audio (based layer video and audio) data has relatively high delay and reliability requirements, and enhancement layer video (enhancement layer video) data has relatively low delay and reliability requirements. Therefore, referring to FIG. 5, if the terminal initiates a visual data service, the terminal may send request information 1. The request information 1 is used to request to establish a QoS flow 1, the QoS flow 1 is used to transmit basic layer video and audio data, the request information 1 includes first indication information, and the first indication information is used to indicate to perform network coding on the QoS flow 1. The terminal may further send request information 2. The request information 2 is used to request to establish a QoS flow 2, the QoS flow 2 is used to transmit enhancement layer video data, and the request information does not include information used to indicate to perform network coding on the QoS flow 2.

The request information may include a QoS class identifier (QoS class identifier, QCI), and a QoS requirement of the first QoS flow may be indicated by using the QCI. The QCI may also indicate whether to perform network coding on the first QoS flow. For example, some QCIs may indicate to perform network coding on a QoS flow (for example, QCIs with some values may indicate to perform network coding on the QoS flow), and these QCIs may be newly defined QCIs (for example, some newly defined values of QCIs, where QCIs with these values may indicate to perform network coding on the QoS flow), or may be existing QCIs (for example, some existing values of QCIs, where QCIs with these values may indicate to perform network coding on the QoS flow). When a QCI does not indicate to perform network coding on the QoS flow, the request information may include information indicating whether to perform network coding on the first QoS flow. The information may be a parameter. When this parameter exists, it indicates that network coding is requested for the first QoS flow, and when this parameter does not exist, it indicates that network coding is not requested for the first QoS flow. Alternatively, the information may be 1 bit. When a value of the bit is 1, it indicates that network coding is requested for the first QoS flow, and when the value of the bit is 0, it indicates that network coding is not requested for the first QoS flow; or vice versa. When a QCI indicates to perform network coding on the QoS flow, the request information may not include information indicating to perform network coding on the first QoS flow.

Optionally, the request information further includes one or both of the following information: information about a type of network coding performed on the first QoS flow, or information about a protocol layer used to implement the type of network coding performed on the first QoS flow.

Types of network coding in this application may include RLNC, BATS coding, fountain coding, and the like. There may be only one type of network coding performed on the first QoS flow, or there may be a plurality of types of network coding performed on the first QoS flow. A protocol layer used to implement the type of network coding may be a packet data convergence protocol (packet data convergence protocol, PDCP) layer, a radio link control (radio link control, RLC) layer, or another protocol layer. Because a lower protocol layer used to implement a type of network coding, flexibility is higher when the type of network coding is implemented, and therefore, the information may be used to select a type of network coding used by the terminal.

If the PCF receives the request information from the service server, optionally, the request information further includes one or more of the following information: address information of the terminal, address information of the service server, or an identifier of the terminal. The information may be used for downlink service data transmission in a subsequent process.

For example, the address information of the terminal may be at least one of an IP address, a port number, and the like of the terminal. The address information of the service server may be at least one of an IP address, a port number, a uniform resource locator (Uniform Resource Locator, URL), and the like of the service server. The identifier of the terminal may be a subscriber permanent identifier (subscriber permanent identifier, SUPI).

402: The PCF sends network coding information to a communication device based on the request information. The network coding information includes second indication information, and the second indication information is used to indicate a QoS flow on which network coding is to be performed. Correspondingly, the communication device receives the network coding information from the PCF.

The communication device may include the access network device accessed by the terminal and/or the terminal.

403: The communication device performs network coding on the QoS flow indicated by the second indication information.

In the method provided in this embodiment of this application, a method for applying network coding to a mobile communication network is provided, and a core network may indicate to perform network coding on a QoS flow, so that a data transmission delay is reduced while transmission reliability of the QoS flow is improved.

Optionally, before step 402, the method further includes:

(11) The PCF determines the network coding information.

If the PCF determines to perform network coding on the first QoS flow, the QoS flow indicated by the second indication information is the first QoS flow; or if the PCF determines not to perform network coding on the first QoS flow, the QoS flow indicated by the second indication information is a second QoS flow.

The second QoS flow may be a QoS flow with a QoS parameter that is the same as or similar to that of the first QoS flow, to meet a service requirement of the first service. The QoS flow may have a plurality of QoS parameters, for example, a delay and a packet loss rate. Similar QoS flows may be two QoS flows whose QoS parameters are partially the same, for example, two QoS flows with a same delay and/or packet loss rate. Similar QoS flows may be alternatively two QoS flows whose difference of a same QoS parameter does not exceed a threshold. The threshold may be preset, predefined, specified in a protocol, or determined through negotiation between network elements. This is not limited in this application. For example, two QoS flows whose delay difference does not exceed 2 ms may be considered as similar QoS flows, or two QoS flows whose delay difference does not exceed 2 ms and/or whose packet loss rate difference does not exceed 0.1% may be considered as similar QoS flows.

Optionally, during specific implementation, step (11) includes: The PCF determines the network coding information based on a network coding capability of the terminal and a network coding capability of the access network device. The terminal and the access network device may separately send respective network coding capabilities to the PCF. Correspondingly, the PCF receives the network coding capability of the terminal and the network coding capability of the access network device, to obtain the network coding capability of the terminal and the network coding capability of the access network device.

For example, when performing network registration, the terminal may use the network coding capability as one type of radio capability information (radio capability information) of the terminal and send the network coding capability to the PCF. For example, the terminal may send the network coding capability to the PCF by using the access network device, the AMF, and the SMF, and after receiving the network coding capability of the terminal, the AMF may store the network coding capability of the terminal in a context of the terminal. In a process of establishing an N2 connection, the access network device may send the network coding capability of the access network device to the AMF, and the AMF sends the network coding capability of the access network device to the PCF directly or by using the SMF.

Optionally, the network coding capability includes one or both of the following information: information about a type of supported network coding, or information about a protocol layer used to implement each type of the supported network coding. For example, for a possible case of the network coding capabilities of the terminal and the access network device, refer to Table 3.

TABLE 3

| | | RLNC | BATS coding | Fountain coding |
|---|---|---|---|---|
| Network coding capability of the terminal | Type of supported network coding Protocol layer used to implement each type of network coding | RLNC PDCP and RLC | BATS coding RLC | Fountain coding PDCP |
| Network coding capability of the access network device | Type of supported network coding Protocol layer used to implement each type of network coding | RLNC PDCP and RLC | BATS coding RLC | |

Optionally, the terminal and the access network device may further indicate, to the PCF, whether the terminal and the access network device support network coding. Specifically, the indication may be performed by using one identifier, for example, one flag bit. A name of the flag bit may be Support_NC. If the flag bit occupies 1 bit, a value 1 of the bit indicates that network coding is supported, and a value 0 of the bit indicates that network coding is not supported; or vice versa. For any type of network coding, one flag bit may also be used to indicate whether the type of network coding is supported. For example, for RLNC, a name of the flag bit may be Support_NC_RLNC. If the flag bit occupies 1 bit, a value 1 of the bit indicates that RLNC is supported, and a value 0 of the bit indicates that RLNC is not supported; or vice versa. For BATS coding, a name of the flag bit may be Support_NC_BATS. If the flag bit occupies 1 bit, a value 1 of the bit indicates that BATS coding is supported, and a value 0 of the bit indicates that BATS coding is not supported; or vice versa.

If the request information includes only the information about the type of network coding performed on the first QoS flow, the PCF may determine whether the terminal and the access network device support the type of network coding performed on the first QoS flow. If the terminal and the access network device support the type of network coding performed on the first QoS flow, the PCF determines to perform network coding on the first QoS flow. If the terminal and the access network device do not support the type of network coding performed on the first QoS flow, the PCF determines not to perform network coding on the first QoS flow. For example, the network coding capabilities of the terminal and the access network device are shown in Table 3. If the type that is of network coding performed on the first QoS flow and that is included in the request information is RLNC, because both the terminal and the access network device support network coding of the type of RLNC, the PCF determines to perform network coding on the first QoS flow. If the type that is of network coding performed on the first QoS flow and that is included in the request information is fountain coding, because the access network device does not support network coding of the type of fountain coding, the PCF determines not to perform network coding on the first QoS flow.

If the request information includes the information about the type of network coding performed on the first QoS flow and the information about the protocol layer used to implement the type of network coding performed on the first QoS flow, and if the PCF determines, based on the network coding capabilities, that the terminal and the access network device support the type of network coding performed on the first QoS flow and a protocol layer in the network coding capabilities that is used to implement the type of network coding is consistent with the protocol layer in the request information, the PCF determines to perform network coding on the first QoS flow; otherwise, the PCF determines not to perform network coding on the first QoS flow. For example, the network coding capabilities of the terminal and the access network device are shown in Table 3. If the type that is of network coding performed on the first QoS flow and that is included in the request information is RLNC, and the protocol layer used to implement the type of network coding performed on the first QoS flow is PDCP, the PCF determines to perform network coding on the first QoS flow; or if the type that is of network coding performed on the first QoS flow and that is included in the request information is BATS coding, and the protocol layer used to implement the type of network coding on the first QoS flow is PDCP, the PCF determines not to perform network coding on the first QoS flow.

During specific implementation, in step (11), in addition to the network coding capabilities of the terminal and the access network device, the PCF may determine the network coding information with reference to other information (for example, information about a QoS flow permitted by the terminal, a service requirement, or an application requirement). This is not limited in this application. For example, if the first QoS flow is not a QoS flow permitted by the terminal, the PCF determines not to perform network coding on the first QoS flow.

In the foregoing embodiment, if the PCF determines not to perform network coding on the first QoS flow, in one case, the PCF may re-determine a QoS flow, namely, the second QoS flow, and send the network coding information to the terminal and the access network device. In another case, alternatively, the PCF may not determine another QoS flow, but send, to the device (the terminal or the service server) that sends the request information, indication information indicating that execution of network coding on the first QoS flow is not accepted.

Optionally, the network coding information further includes one or both of the following information: information about a type of network coding performed on the QoS flow indicated by the second indication information, or information about a protocol layer used to implement the type of network coding performed on the QoS flow indicated by the second indication information. In this case, during specific implementation, step 403 may include: The communication device performs, based on the network coding information, network coding on the QoS flow indicated by the second indication information.

For example, if the network coding information further includes the information about the type of network coding performed on the QoS flow indicated by the second indication information, the communication device performs, by using the type of network coding, network coding on the QoS flow indicated by the second indication information. If the network coding information further includes the information about the protocol layer used to implement the type of network coding performed on the QoS flow indicated by the second indication information, the communication device performs, at the protocol layer indicated by the information, network coding on the QoS flow indicated by the second indication information.

Optionally, that the communication device performs, based on the network coding information, network coding on the QoS flow indicated by the second indication information includes: The communication device performs, based on the network coding information and current channel quality, network coding on the QoS flow indicated by the second indication information.

To support reliable data transmission, in the conventional technology, a forward error correction (forward error correction, FEC) manner is usually used at a service layer (which may also be referred to as an application (application, APP) layer), and a redundant packet of service data is generated by using an FEC algorithm and is transmitted. In the FEC mechanism, a real-time status of a network is not considered, and an FEC parameter cannot be determined in real time based on the real-time status of the network. Therefore, an excessively large quantity of redundant packets may be generated, further increasing network transmission load; or an excessively small quantity of redundant packets may be generated and reliable transmission cannot be supported.

In this embodiment of this application, the communication device may obtain channel quality, and may select a network coding parameter, for example, a ratio of n to n', based on the current channel quality. If the channel quality is relatively good, the ratio of n to n' may be relatively large, and if the channel quality is relatively poor, the ratio of n to n' may be relatively small, to avoid existing problems that network transmission load is further increased due to generation of an excessively large quantity of redundant packets and reliable transmission cannot be supported due to generation of an excessively small quantity of redundant packets.

Optionally, after the first QoS flow is successfully configured, the method further includes: The PCF sends third indication information to the service server, and the service server performs application layer transmission adaptation based on the third indication information. For example, when transmission is performed by using a user datagram protocol (user datagram protocol, UDP), an upper-layer application does not perform error correction and data redundancy processing (in other words, does not use FEC).

In the foregoing embodiment, an example in which the request information requests to perform network coding on the first QoS flow of the terminal is used for description.

During actual implementation, the request information may alternatively request to perform network coding on a plurality of QoS flows of the terminal. This is not limited in this application.

To make embodiments of this application clearer, the following uses examples to describe the foregoing method by using Embodiment 1 to Embodiment 3.

Embodiment 1

Figure 6:
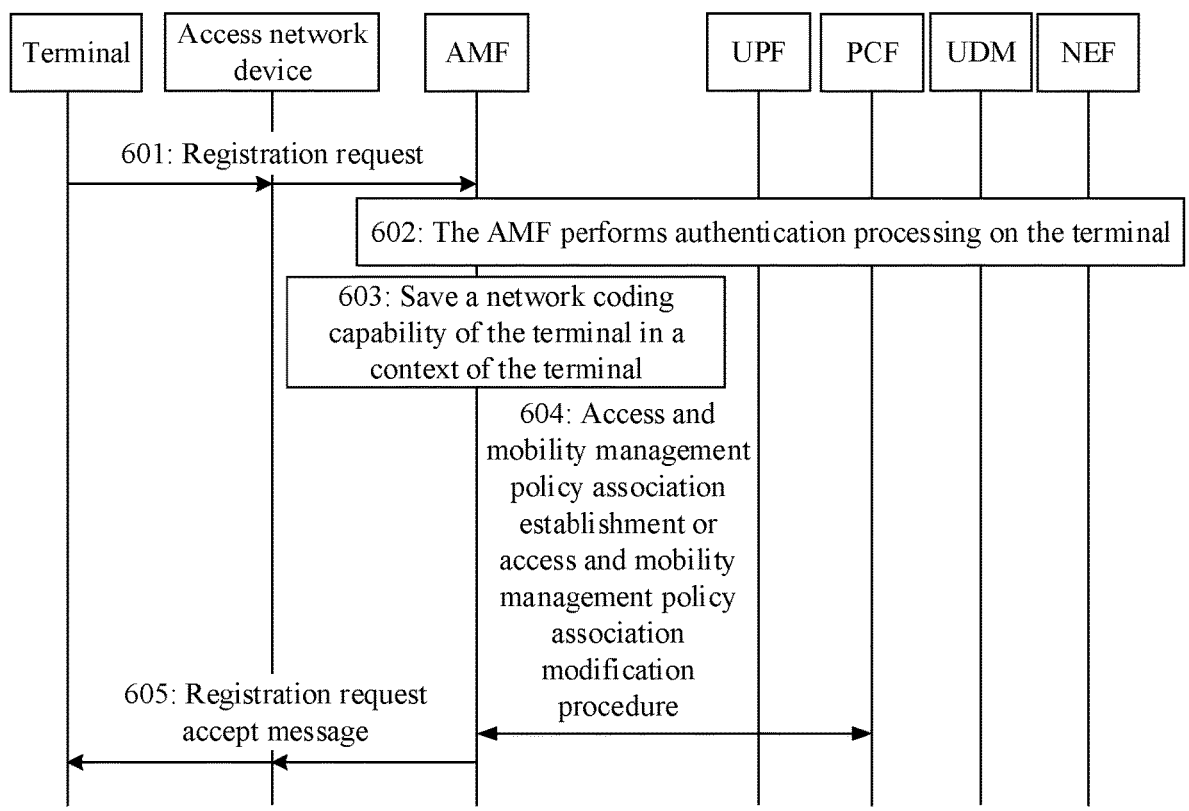
FIG. 6 is a flowchart of another communication method according to an embodiment of this application.

Embodiment 1 uses an example to describe a process in which a terminal reports a network coding capability in the foregoing embodiment. Referring to FIG. 6, the method includes the following steps.

601: The terminal sends a registration request (Registration Request) to an AMF by using an access network device. Correspondingly, the AMF receives the registration request from the terminal by using the access network device.

The registration request may be non-access stratum (non-access stratum, NAS) information. The registration request includes network coding capability information (NC capability information) of the terminal. The network coding capability of the terminal may be one type of radio capability information of the terminal. For descriptions of the network coding capability, refer to the foregoing descriptions. Details are not described again.

During specific implementation, in step 601, after receiving the registration request sent by the terminal, the access network device may perform AMF selection (AMF selection), and send the registration request to the selected AMF.

602: The AMF performs authentication processing on the terminal.

The AMF may determine authenticity of an identity of the terminal through authentication processing, the AMF and the terminal determine a key for a control plane connection, and the like. This step belongs to the conventional technology, and is not described in detail in this embodiment.

603: The AMF saves the network coding capability of the terminal in a context (UE Context) of the terminal.

604: The AMF and a PCF perform an access and mobility management policy association establishment (AM policy association establishment) or access and mobility management policy association modification (AM policy association modification) procedure.

In the AM policy association establishment or AM policy association modification procedure, the AMF sends the network coding capability of the terminal to the PCF. For example, the network coding capability of the terminal may be carried in an information unit in an AM policy establishment request or an AM policy modification request.

605: The AMF sends a registration request accept message to the terminal to notify the terminal that the registration request of the terminal is accepted and the terminal is allowed to register with a mobile network. This step belongs to the conventional technology, and is not described in detail in this embodiment.

In the method provided in Embodiment 1, the terminal may provide the network coding capability of the terminal to a core network, so that the core network can determine, based on a capability of the terminal, whether to enable network coding for an established QoS flow.

Embodiment 2

Embodiment 2 describes a process in which a terminal establishes a data connection between the terminal and a service server (namely, an AF) through a PDU session modification procedure when initiating an XR service.

Figure 7:
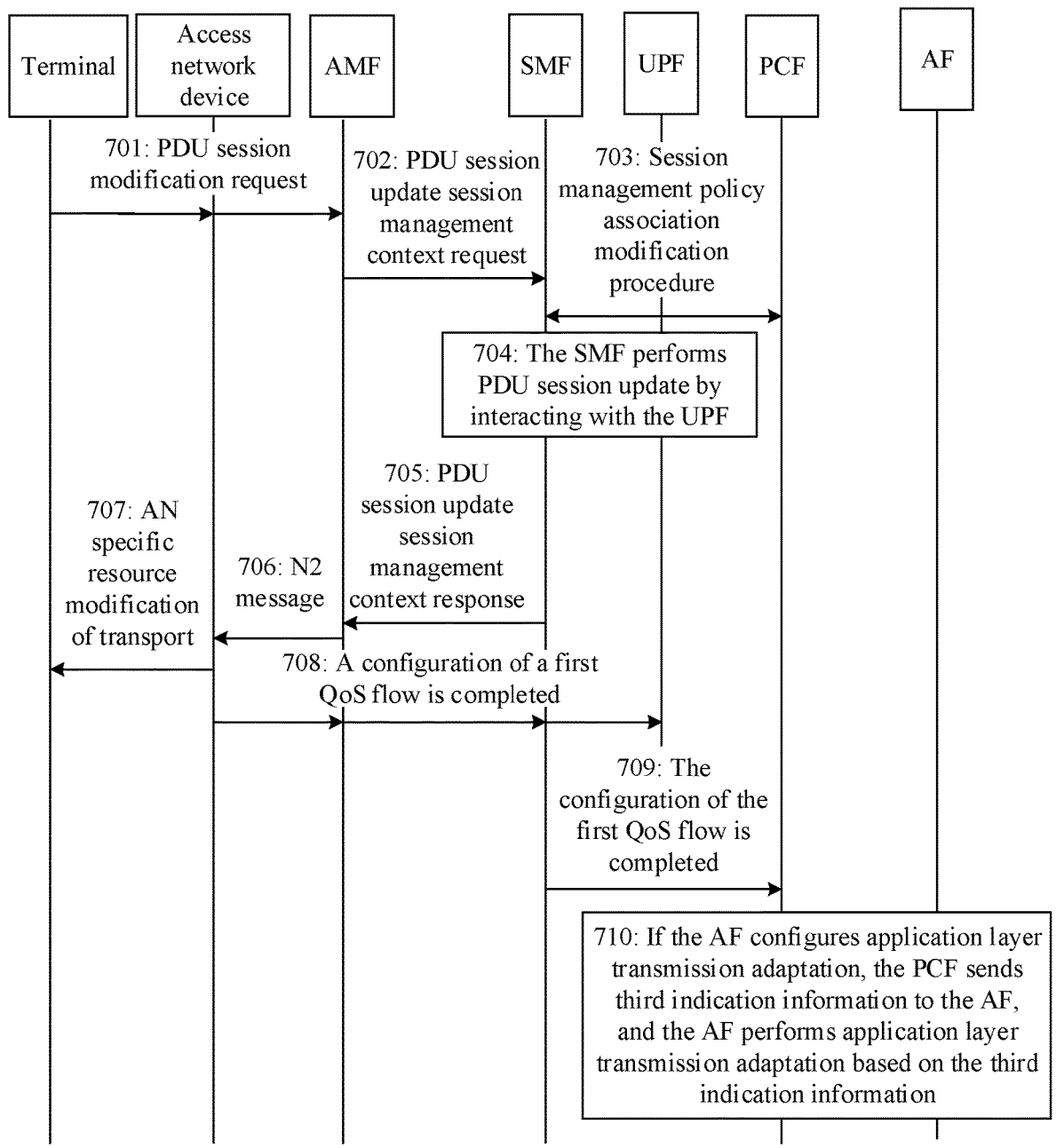
FIG. 7 is a flowchart of another communication method according to an embodiment of this application.

Referring to FIG. 7, the method includes the following steps.

701: When enabling the XR service, the terminal sends a PDU session modification request (PDU session modification request) to an AMF by using an access network device. Correspondingly, the AMF receives the PDU session modification request from the terminal by using the access network device.

The PDU session modification request includes request information. For related descriptions of the request information, refer to the foregoing descriptions. Details are not described again.

702: The AMF sends a PDU session update session management context (Nsmf PDUsession update SM context) request to an SMF. Correspondingly, the SMF receives the Nsmf PDUsession update SM context request from the AMF.

The Nsmf PDUsession update SM context request includes the request information.

703: The SMF and a PCF perform a session management policy association modification (SM Policy Association Modification) procedure.

In the SM policy association modification procedure, the SMF requests a session management policy (SM Policy) from the PCF. The request includes the request information. The PCF sends a response to the SMF. The response includes network coding information. For related descriptions of the network coding information, refer to the foregoing descriptions. Details are not described again.

In Embodiment 2, an example in which a QoS flow indicated by second indication information included in the network coding information is a first QoS flow is used for description.

After determining to perform network coding on the first QoS flow, the PCF determines to establish the first QoS flow.

704: The SMF performs PDU session update by interacting with a UPF.

During specific implementation, in step 704, the SMF may send an N4 PDU session establishment request (N4 PDU session establishment request) to the UPF, and correspondingly, the UPF sends an N4 PDU session establishment response (N4 PDU session establishment response) to the SMF. Alternatively, the SMF may send an N4 PDU session modification request (N4 PDU session modification request) to the UPF, and correspondingly, the UPF sends an N4 PDU session modification response (N4 PDU session modification response) to the SMF.

705: The SMF sends a PDU session update session management context response (response of Nsmf PDUsession update SM context) to the AMF. Correspondingly, the AMF receives the PDU session update session management context response from the SMF.

The PDU session update session management context response includes N2 flow configuration information and a PDU session modification acknowledgement (PDU session modification ACK). The N2 flow configuration information includes network coding information sent to the access network device, and the PDU session modification ACK includes network coding information sent to the terminal.

706: The AMF sends an N2 message (N2 message) to the access network device. Correspondingly, the access network device receives the N2 message from the AMF.

The N2 message includes the N2 flow configuration information and the PDU session modification ACK.

707: The access network device sends an AN specific resource modification of transport (AN specific resource modification of transport) to the terminal. Correspondingly, the terminal receives the AN specific resource modification of transport from the access network device.

The AN specific resource modification of transport includes the PDU session modification ACK. For example, the AN specific resource modification of transport may be an RRC connection reconfiguration (RRC Connection Reconfiguration) message.

708: The access network device notifies, by using the AMF and the SMF, the UPF that the configuration of the first QoS flow is completed.

The access network device may notify, by using a response message of the N2 message, the AMF that the configuration of the first QoS flow is completed. The AMF may notify, by using a PDU session update session management context request (PDU session update SM context request), the SMF that the configuration of the first QoS flow is completed. The SMF notifies, by using an N4 PDU session modification request (N4 PDU session modification request), the UPF that the configuration of the first QoS flow is completed.

709: The SMF notifies the PCF that the configuration of the first QoS flow is completed.

The configuration of the first QoS flow in step 708 and step 709 is configuration about networking coding.

710: If the AF configures application layer transmission adaptation, the PCF sends third indication information to the AF, and the AF performs application layer transmission adaptation based on the third indication information.

Embodiment 3

Embodiment 3 describes a process in which a service server (namely, an AF) establishes a data connection between a terminal and the AF through a PDU session modification procedure when initiating an XR service.

Figure 8:
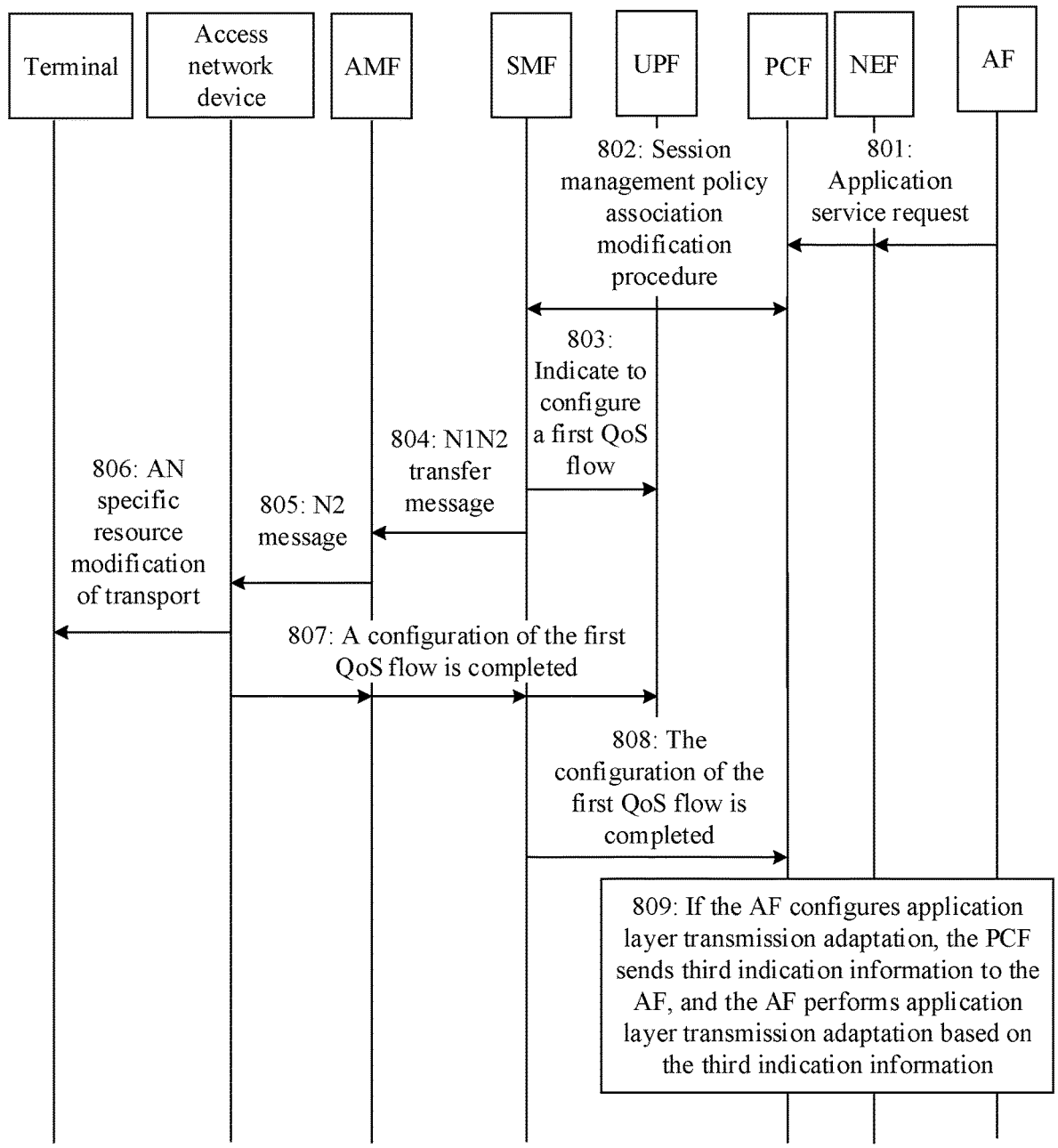
FIG. 8 is a flowchart of still another communication method according to an embodiment of this application.

Referring to FIG. 8, the method includes the following steps.

801: The AF sends an application service request (Application service request) to a PCF by using an NEF.

The application service request may include request information. For related descriptions of the request information, refer to the foregoing descriptions. Details are not described again.

During specific implementation, in step 801, the AF may send the application service request to the NEF, and the NFE may send the application service request to the PCF that manages a QoS flow of the terminal.

802: The PCF and an SMF perform a session management policy association modification procedure.

For related descriptions of step 802, refer to step 703. Details are not described again.

803: The SMF indicates, through an N4 PDU session establishment (N4 PDU session establishment) procedure or an N4 PDU session modification (N4 PDU session modification) procedure, a UPF to configure a first QoS flow (for example, configure existing information such as a QCI) for the terminal. Correspondingly, the UPF configures the first QoS flow for the terminal according to the indication.

804: The SMF sends an N1N2 transfer message (Namf communication N1N2 message transfer) to an AMF. Correspondingly, the AMF receives the N1N2 transfer message from the SMF.

The N1N2 transfer message includes N2 flow configuration information and a PDU session modification command (PDU session modification Command). The N2 flow configuration information includes network coding information sent to an access network device, and specifically includes an indication indicating a QoS flow for which network coding is enabled and an indication of a type of enabled network coding. The type of network coding includes RLNC, BATS coding, fountain coding, and the like. The PDU session modification command includes network coding information sent to the terminal, and specifically includes an indication indicating a QoS flow for which network coding is enabled and an indication of a type of enabled network coding.

805: The AMF sends an N2 message (N2 message) to the access network device. Correspondingly, the access network device receives the N2 message from the AMF.

The N2 message includes the N2 flow configuration information and the PDU session modification command. The AMF indicates, by using the N2 message, the access network device to establish the first QoS flow for the terminal. The N2 message includes QoS configuration information (for example, existing information such as a QCI) corresponding to the first QoS flow.

806: The access network device sends an AN specific resource modification of transport to the terminal. Correspondingly, the terminal receives the AN specific resource modification of transport from the access network device.

In the AN specific resource modification of transport, the access network device sends, to the terminal, an indication indicating a QoS flow for which network coding is enabled, and may further send, to the terminal, a type of enabled network coding and a network coding configuration parameter of the type of network coding, for example, a size of a packet on which network coding is to be performed, so that the access network device and the terminal agree on the network coding configuration parameter, and perform encoding and decoding operations on a packet of the QoS flow based on the configuration parameter.

The AN specific resource modification of transport includes the PDU session modification command. For example, the AN specific resource modification of transport may be an RRC connection reconfiguration message.

Before step 806, the access network device determines, based on the N2 flow configuration information in the N2 message, to enable network coding for the established first QoS flow.

Steps 807 to 809 are respectively the same as steps 708 to 710.

The foregoing mainly describes the solutions in embodiments of this application from a perspective of interaction between network elements. It may be understood that, to implement the foregoing functions, the network elements such as the PCF, the communication device, and the service server include a hardware structure and/or a software module for performing the functions. A person skilled in the art should be easily aware that units, algorithms, and steps in the examples described with reference to the embodiments disclosed in this specification can be implemented in a form of hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, function unit division may be performed on the PCF, the communication device, and the service server based on the foregoing method examples. For example, function units may be obtained through division based on corresponding functions, or two or more functions may be integrated into one processing unit. The integrated unit may be implemented in a form of hardware, or may be implemented in a form of a software function unit. It should be noted that, in embodiments of this application, division into the units is an example, and is merely logical function division. During actual implementation, another division manner may be used.

Figure 9:
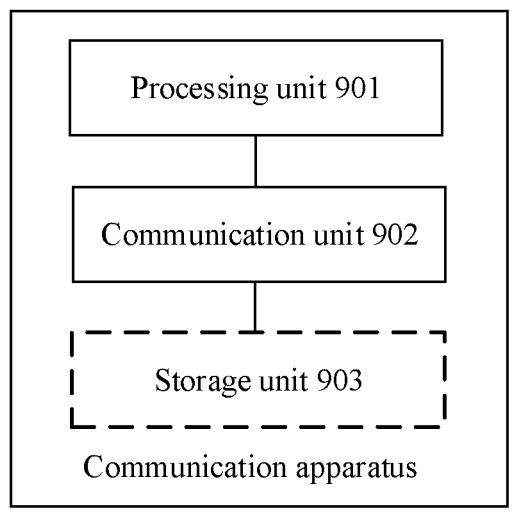
FIG. 9 is a schematic diagram of composition of a communication apparatus according to an embodiment of this application.

When an integrated unit is used, FIG. 9 shows a communication apparatus in the foregoing embodiment. The communication apparatus may include a processing unit 901 and a communication unit 902. Optionally, the communication apparatus further includes a storage unit 903.

For example, the communication apparatus may be the PCF mentioned above or a chip applied to the PCF. In this case, the processing unit 901 is configured to support the PCF in performing 401 and 402 in FIGS. 4, 602 and 604 in FIGS. 6, 703, 709 and 710 in FIGS. 7, 801, 802, 808 and 809 in FIG. 8, and/or another operation that needs to be performed by the PCF in embodiments of this application. The processing unit 901 is further configured to communicate with another network entity by using the communication unit 902, for example, communicate with the SMF in FIG. 8. The storage unit 903 is configured to store program code and data of the PCF.

For another example, the communication apparatus may be the communication device mentioned above or a chip applied to the communication device. In this case, the processing unit 901 is configured to support the communication device in performing 402 and 403 in FIGS. 4, 601 and 605 in FIG. 6 (in this case, the communication device is a terminal or an access network device), 701 and 707 in FIG. 7 (in this case, the communication device is a terminal), 701, 706, 707 and 708 in FIG. 7 (in this case, the communication device is an access network device), 806 in FIG. 8 (in this case, the communication device is a terminal), 805 to 807 in FIG. 8 (in this case, the communication device is an access network device), and/or another operation that needs to be performed by the communication device in embodiments of this application. The processing unit 901 is further configured to communicate with another network entity by using the communication unit 902, for example, communicate with the access network device (in this case, the communication device is a terminal) or the AMF (in this case, the communication device is an access network device) in FIG. 8. The storage unit 903 is configured to store program code and data of the communication device.

For another example, the communication apparatus may be the service server mentioned above or a chip applied to the service server. In this case, the processing unit 901 is configured to support the service server in performing 710 in FIG. 7 (in this case, the service server is an AF), 801 and 809 in FIG. 8 (in this case, the service server is an AF), and/or another operation that needs to be performed by the service server in embodiments of this application. The processing unit 901 is further configured to communicate with another network entity by using the communication unit 902, for example, communicate with the NEF in FIG. 8. The storage unit 903 is configured to store program code and data of the service server.

When the integrated unit in FIG. 9 is implemented in the form of a software functional unit and sold or used as an independent product, the integrated unit may be stored in a computer-readable storage medium. Based on such an understanding, the technical solutions of this application essentially, or the part contributing to the conventional technology, or all or a part of the technical solutions may be implemented in the form of a software product. The computer software product is stored in a storage medium and includes several instructions for instructing a computer device (which may be a personal computer, a server, or a network device) or a processor (processor) to perform all or a part of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The unit in FIG. 9 may also be referred to as a module. For example, the processing unit may be referred to as a processing module.

Figure 10:
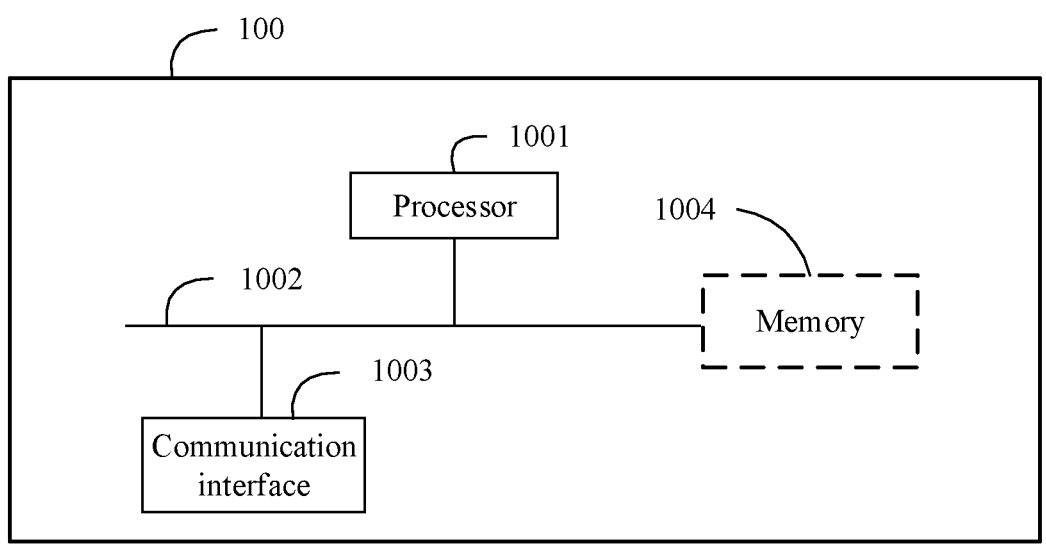
FIG. 10 is a schematic diagram of a hardware structure of a communication apparatus according to an embodiment of this application.

FIG. 10 is a schematic diagram of a hardware structure of a communication apparatus 100 according to an embodiment of this application. The communication apparatus 100 includes one or more processors 1001 and a communication interface 1003.

Optionally, the communication apparatus 100 further includes a memory 1004. The memory 1004 may include a ROM and a RAM, and provide operation instructions and data for the processor 1001. A part of the memory 1004 may further include a non-volatile random access memory (non-volatile random access memory, NVRAM).

In this embodiment of this application, the communication apparatus 100 executes corresponding operations by invoking the operation instructions (the operation instructions may be stored in an operating system) stored in the memory 1004.

The processor 1001 may also be referred to as a central processing unit (Central Processing Unit, CPU).

The processor 1001, the communication interface 1003, and the memory 1004 are coupled together by using a bus system 1002. In addition to a data bus, the bus system 1002 may include a power bus, a control bus, a status signal bus, and the like. However, for clear description, various types of buses in FIG. 10 are marked as the bus system 1002.

The method disclosed in embodiments of this application may be applied to the processor 1001, or may be implemented by the processor 1001. The processor 1001 may be an integrated circuit chip and has a signal processing capability. In an implementation process, the steps in the foregoing method may be implemented by using a hardware integrated logical circuit in the processor 1001, or by using instructions in a form of software. The processor 1001 may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, for example, a RAM, a flash memory, a ROM, a programmable read-only memory, an electrically erasable programmable memory, or a register.

In a possible implementation, the processor 1001 controls the communication interface 1003 to perform receiving and sending steps performed by the PCF, the communication device, and the service server in embodiments of this application. The processor 1001 is configured to perform processing steps performed by the PCF, the communication device, and the service server in embodiments of this application.

The foregoing communication unit or communication interface may be an interface circuit on the communication apparatus, and is configured to receive a signal from another apparatus. For example, when the communication apparatus is implemented by a chip, the communication unit or the communication interface is an interface circuit used by the chip to receive a signal from another chip or apparatus or send a signal.

In embodiments, the instructions that are stored in the memory and that are to be executed by the processor may be implemented in a form of a computer program product. The computer program product may be written into the memory in advance, or may be downloaded and installed in the memory in a form of software.

An embodiment of this application further provides a computer-readable storage medium. The computer-readable storage medium stores computer instructions, and when the computer-readable storage medium runs on a computer, the computer performs the method provided in embodiments of this application.

An embodiment of this application further provides a computer program product including computer instructions. When the computer program product runs on a computer, the computer can perform the method provided in embodiment of this application.

An embodiment of this application provides a chip. The chip includes a processor, and when the processor executes instructions, the chip can perform the method provided in embodiments of this application.

An embodiment of this application provides a communication system, including one or more of the foregoing PCF, terminal, access network device, or service server.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

Although this application is described with reference to all the embodiments herein, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of "a plurality of". A single processor or another unit may implement several functions enumerated in the claims. Some measures are set forth in dependent claims that are different from each other, but this does not mean that these measures cannot be combined to produce a great effect.

Although this application is described with reference to specific features and all the embodiments thereof, it is clear that various modifications and combinations may be made to them without departing from the spirit and scope of this application. Correspondingly, this specification and the accompanying drawings are merely example descriptions of this application defined by the appended claims, and are considered as any or all of modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A communication method, comprising:
   receiving, by a policy control function (PCF), request information from a terminal or a service server, wherein the request information is used to request to establish a first quality of service (QoS) flow for the terminal, the request information comprises first indication information used to indicate to perform network coding on the first QoS flow, and the service server is a service server of a service corresponding to the first QoS flow; and
   sending, by the PCF based on the request information, network coding information to at least one of an access network device accessed by the terminal or the terminal, wherein the network coding information comprises second indication information used to indicate a QoS flow on which network coding is to be performed.

2. The method according to claim 1, wherein the request information further comprises at least one of the following information: information about a type of network coding performed on the first QoS flow, or information about a protocol layer used to implement the type of network coding performed on the first QoS flow.

3. The method according to claim 1, wherein the request information received by the PCF is from the service server, and the request information further comprises at least one of the following information: address information of the terminal, address information of the service server, or an identifier of the terminal.

4. The method according to claim 1, wherein the network coding information further comprises at least one of the following information: information about a type of network coding performed on the QoS flow indicated by the second indication information, or information about a protocol layer used to implement the type of network coding performed on the QoS flow indicated by the second indication information.

5. The method according to claim 1, the method further comprising:
  determining, by the PCF, the network coding information, wherein
    if the PCF determines to perform network coding on the first QoS flow, the QoS flow indicated by the second indication information is the first QoS flow; or
    if the PCF determines not to perform network coding on the first QoS flow, the QoS flow indicated by the second indication information is a second QoS flow.

6. The method according to claim 5, wherein the determining, by the PCF, the network coding information comprises:
  determining, by the PCF, the network coding information based on a network coding capability of the terminal and a network coding capability of the access network device.

7. The method according to claim 6, wherein the network coding capability comprises at least one of the following information: information about a type of supported network coding, or information about a protocol layer used to implement each type of the supported network coding.

8. The method according to claim 6, the method further comprising:
  receiving, by the PCF, the network coding capability from the terminal; and/or
  receiving, by the PCF, the network coding capability from the access network device.

9. A communication apparatus, comprising:
  a processor; and
  a non-transitory computer-readable storage medium coupled to the processor and configured to store a program comprising instructions that, when be executed by the processor, cause the communication apparatus to:
  receive request information from a terminal or a service server, wherein the request information is used to request to establish a first quality of service (QoS) flow for the terminal, the request information comprises first indication information used to indicate to perform network coding on the first QoS flow, and the service server is a service server of a service corresponding to the first QoS flow; and
  send, based on the request information, network coding information to at least one of an access network device accessed by the terminal or the terminal, wherein the network coding information comprises second indication information used to indicate a QoS flow on which network coding is to be performed.

10. The communication apparatus according to claim 9, wherein the request information further comprises at least one of the following information: information about a type of network coding performed on the first QoS flow, or information about a protocol layer used to implement the type of network coding performed on the first QoS flow.

11. The communication apparatus according to claim 9, wherein the request information is from the service server, and the request information further comprises at least one of the following information: address information of the terminal, address information of the service server, or an identifier of the terminal.

12. The communication apparatus according to claim 9, wherein the network coding information further comprises at least one of the following information: information about a type of network coding performed on the QoS flow indicated by the second indication information, or information about a protocol layer used to implement the type of network coding performed on the QoS flow indicated by the second indication information.

13. The communication apparatus according to claim 9, wherein the program further comprises instructions that, when executed by the processor, cause the communication apparatus to determine the network coding information, wherein
  if it is determined to perform network coding on the first QoS flow, the QoS flow indicated by the second indication information is the first QoS flow; or
  if it is determined not to perform network coding on the first QoS flow, the QoS flow indicated by the second indication information is a second QoS flow.

14. The communication apparatus according to claim 13, wherein the program further comprises instructions that, when executed by the processor, cause the communication apparatus to:
  determine the network coding information based on a network coding capability of the terminal and a network coding capability of the access network device.

15. The communication apparatus according to claim 14, wherein the network coding capability comprises at least one of the following information: information about a type of supported network coding, or information about a protocol layer used to implement each type of the supported network coding.

16. The communication apparatus according to claim 14, wherein the program further comprises instructions that, when executed by the processor, cause the communication apparatus to:
  receive the network coding capability from the terminal; and/or
  receive the network coding capability from the access network device.

17. A communication apparatus, comprising:
  a processor; and
  a non-transitory computer-readable storage medium coupled to storing a program comprising instructions that, when executed by the processor, cause the communication apparatus to:
  receive network coding information from a policy control function (PCF), wherein the network coding information comprises second indication information used to indicate a quality of service (QoS) flow on which network coding is to be performed, and the communication apparatus is a terminal or an access network device; and
  perform network coding on the QoS flow indicated by the second indication information.

18. The communication apparatus according to claim 17, wherein the network coding information further comprises at least one of the following information: information about a type of network coding performed on the QoS flow indicated by the second indication information, or information about a protocol layer used to implement the type of network coding performed on the QoS flow indicated by the second indication information; and
  wherein the program comprises instructions that, when executed by the processor, cause the communication apparatus to:

perform, based on the network coding information, network coding on the QoS flow indicated by the second indication information.

19. The communication apparatus according to claim 17, wherein the program further comprises instructions that, when executed by the processor, cause the communication apparatus to:
send a network coding capability of the communication apparatus to the PCF, wherein the network coding capability comprises at least one of the following information: information about a type of supported network coding, or information about a protocol layer used to implement each type of the supported network coding.

20. The communication apparatus according to claim 17, wherein the communication apparatus is the terminal; and
the program further comprises instructions that, when executed by the processor, cause the communication apparatus to: send request information for requesting to establish a first QoS flow for the terminal, wherein the request information comprises first indication information used to indicate to perform network coding on the first QoS flow.

* * * * *